US011951733B2

(12) United States Patent
Michael et al.

(10) Patent No.: US 11,951,733 B2
(45) Date of Patent: Apr. 9, 2024

(54) PRINTING MACHINE WITH HYBRID PRINTING TECHNOLOGY

(71) Applicant: Windmöller & Hölscher KG, Lengerich (DE)

(72) Inventors: Sven Michael, Lengerich (DE); Thomas Boosmann, Lengerich (DE); Wolfgang Cordroch, Lengerich (DE); Ralph Luxem, Lengerich (DE); Jens Voelschow, Lengerich (DE); Christian Bruns, Lengerich (DE); Nico Schröder, Lengerich (DE); Martin Flaspöhler, Lengerich (DE); Nils-Henrik Schirmeisen, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/781,207

(22) PCT Filed: Dec. 4, 2020

(86) PCT No.: PCT/EP2020/084625
§ 371 (c)(1),
(2) Date: May 31, 2022

(87) PCT Pub. No.: WO2021/110912
PCT Pub. Date: Jun. 10, 2021

(65) Prior Publication Data

US 2022/0410556 A1 Dec. 29, 2022

(30) Foreign Application Priority Data

Dec. 6, 2019 (EP) .................................... 19214183

(51) Int. Cl.
*B41F 5/24* (2006.01)
*B41F 5/18* (2006.01)
(Continued)

(52) U.S. Cl.
CPC .................. *B41F 5/24* (2013.01); *B41F 5/18* (2013.01); *B41F 19/007* (2013.01); *B41F 23/08* (2013.01);
(Continued)

(58) Field of Classification Search
CPC .. B41F 5/24; B41F 5/18; B41F 19/007; B41F 23/08; B41J 3/546; B41J 11/0015; B41J 15/16
See application file for complete search history.

(56) References Cited

U.S. PATENT DOCUMENTS 5,461,405 A * 10/1995 Lehmann ................ B41J 25/34 347/49
2002/0035942 A1* 3/2002 Reinhard ............ B41F 33/0036 101/484
(Continued)

FOREIGN PATENT DOCUMENTS

JP 2017-530026 A 10/2017
WO 2015160739 A2 10/2015
WO 2017207590 A1 12/2017

OTHER PUBLICATIONS

International Searching Authority—International Search Report, pertaining to International Application No. PCT/EP2020/084625, dated Jan. 14, 2021, together with the Written Opinion of the International Searching Authority and translation pages of ISR, 16 pages.

*Primary Examiner* — David H Banh
(74) *Attorney, Agent, or Firm* — Sunstein LLP

(57) ABSTRACT

The invention relates to a printing machine with hybrid printing technology for printing on a continuous material web. In order to create a printing machine with hybrid printing technology which is adaptable and flexible in use in the course of the current trend for digitization, the printing
(Continued)

Figure 1:
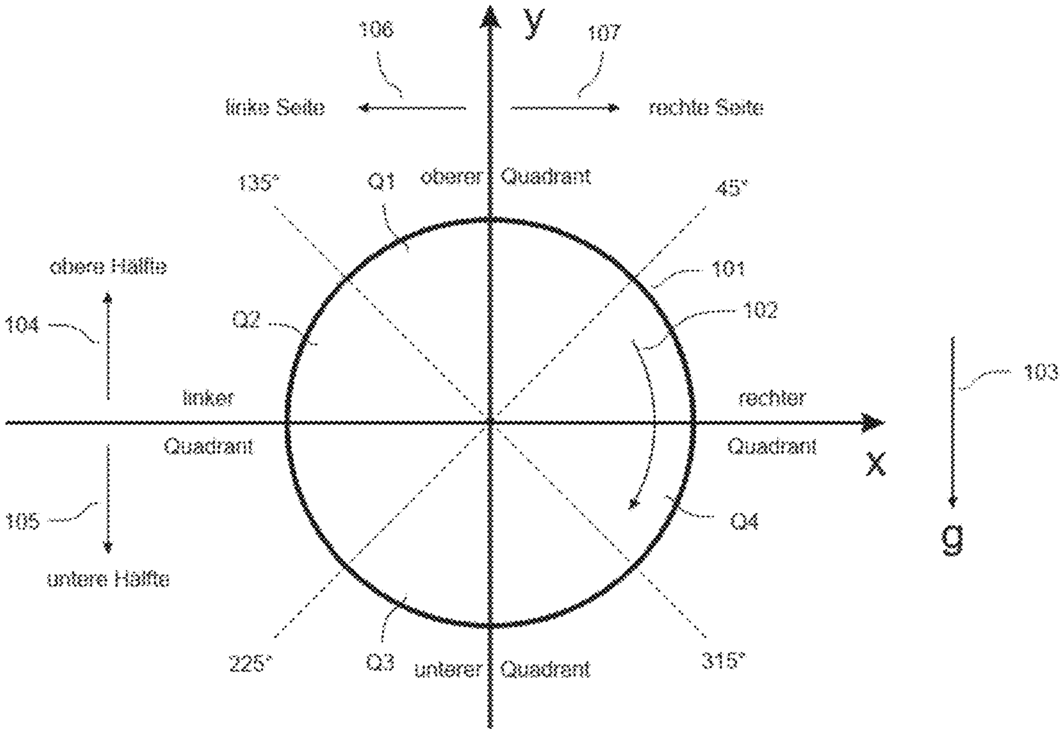

machine with according to the invention, hybrid printing technology for printing a continuous material web, is a printing machine with a rotating central cylinder, on the surface of which the material web is guided from a placement point to a separation point for printing; a plurality of inking units for digital printing of the material web are arranged in the region of an upper half of the central cylinder, and a plurality of inking units for flexographic printing of the material web are arranged in the region of a lower half of the central cylinder; an unwinding station is provided for unwinding the material web to be printed from a roll and a winding station is provided for winding the printed material web onto a roll, the unwinding station and the winding station being arranged on a first side of the central cylinder, with supply guide rollers for feeding the material web unwound from the unwinding station to the central cylinder and with discharge guide rollers for discharging the printed material web from the central cylinder to the winding station; the feed guide rollers and the discharge guide rollers being arranged on a second side of the central cylinder, with a feed guide roller for placing the material web onto the central cylinder at the placement point and a strip guide roller for detaching the material web from the central cylinder, the feed guide roller and the strip guide roller being designed in such a way that the placement point and the separation point are arranged on the lower quadrant of the central cylinder.

12 Claims, 3 Drawing Sheets

(51) Int. Cl.

| | |
|---|---|
| ***B41F 19/00*** | (2006.01) |
| ***B41F 23/08*** | (2006.01) |
| ***B41J 3/54*** | (2006.01) |
| ***B41J 11/00*** | (2006.01) |
| ***B41J 15/16*** | (2006.01) |

(52) U.S. Cl.

CPC .......... *B41J 3/546* (2013.01); *B41J 11/0015* (2013.01); *B41J 15/16* (2013.01)

(56) References Cited

U.S. PATENT DOCUMENTS

| | | | | |
|---|---|---|---|---|
| 2002/0166470 | A1* | 11/2002 | Nedblake, Jr. | B41J 15/046 101/490 |
| 2009/0079572 | A1 | 3/2009 | Atsumi et al. | |
| 2009/0221408 | A1* | 9/2009 | Cope | B29C 66/91431 493/212 |
| 2013/0127962 | A1* | 5/2013 | Yoda | B41J 11/0021 347/102 |
| 2013/0135379 | A1* | 5/2013 | Hori | B41J 15/165 347/102 |
| 2015/0096452 | A1* | 4/2015 | Puig Vil | B41F 9/063 101/152 |
| 2015/0290926 | A1* | 10/2015 | Branca | B41F 5/24 101/212 |
| 2015/0290956 | A1 | 10/2015 | Igarashi | |
| 2018/0244038 | A1 | 8/2018 | Ziegenbalg et al. | |
| 2018/0250927 | A1* | 9/2018 | Ziegenbalg | A61B 3/14 |
| 2018/0314191 | A1* | 11/2018 | Ron | G03G 9/131 |
| 2019/0202195 | A1* | 7/2019 | Gazzani | B41F 23/08 |

* cited by examiner

[Image text:]

104 upper half
105 lower half
106 left side
107 right side
Q1 upper quadrant
Q2 left quadrant
Q3 lower quadrant
Q4 right quadrant

PRINTING MACHINE WITH HYBRID PRINTING TECHNOLOGY

CROSS-REFERENCE TO RELATED APPLICATIONS

This application is the national stage entry under 35 U.S.C. § 371 of International Patent Application No. PCT/EP2020/084625 filed on Dec. 4, 2020, and claims the benefit of European Patent Application No. 19214183.6 filed Dec. 6, 2019, the disclosures of which are incorporated herein by reference in their entirety.

The invention relates to a printing machine with hybrid printing technology for printing on a continuous material web.

For the purposes of the present invention, hybrid printing technology is understood to mean the combination of flexographic printing and digital printing.

In packaging printing, the flexographic printing process is a suitable and proven method for cost-effectively producing long print jobs. Numerous technical developments have also opened up new process engineering possibilities in flexographic printing, such as for example the use of more colors and finer screens.

The term "digital printing" encompasses various digital printing processes. What all these printing processes have in common is that there is no analog print form, and the printing instead occurs directly from the digital database of the pre-press stage. Toner or inks are transferred directly or indirectly to the printing stock. Thus, in contrast to flexographic printing, there are no costs for producing the print form. On the other hand, the ongoing operating costs in digital printing are higher, because digital ink systems are a factor of 10 to 20 times more expensive than ink systems in flexographic printing. The cost-effectiveness of digital printing therefore also depends on the motif and its ink coverage, because the more ink that is applied, the greater the economic impact.

In the packaging industry, in the course of digitization, there is an evident trend towards ever shorter product cycles. In the case of packaging printing, this results in declining print runs for both initial and repeat orders. Particularly when new products or product variants are launched on the market, the required length of the print job may often be difficult to determine precisely. Digital printing offers the possibility of changing the length of the print job at short notice; in addition, in the case of a short print job, it is not burdened with high setup costs. The process therefore delivers the right quantity at the right time. In addition, because the run size is tailored to requirements, there are no costs for storing the packaging. The possibility of trouble-free reprinting also reduces the risk of unneeded stock rolls. Marketing new products, and promoting a wide range of variations in short and very short runs, can be done in the shortest possible time. For short print jobs, digital printing thus offers greater flexibility and is a cost-effective alternative to flexographic printing.

Another trend in the packaging industry is variable data printing. In this area as well, digital printing also has an advantage over flexographic printing. Because there is no permanent print image memory in digital printing, each design can be individualized and implemented in one pass. As a result, the possibility of mass personalization is opened up, making it possible to segment and target customers or individually customizing product promotions with variable designs.

From WO 2012/163829 A1, a digital printing machine is known with two central cylinders and a dryer unit located between the central cylinders. A plurality of inking units for inkjet printing are arranged on the first central cylinder for printing the material web. A device for electrostatically discharging particles adhering to the printing stock web is located on the second central cylinder. In contrast, the combined use of digital printing and flexographic printing is not disclosed in WO 2012/163829 A1. In a digital printing machine of this type, there is thus no possibility of combined use of flexographic printing or of retrofitting of the printing unit. However, customer requirements for the above-mentioned trends are changing. Digital printing machines must therefore be adaptable and flexible.

From WO 2017/207590 A1, a printing machine with hybrid printing technology is known, in which a flexographic printing roller may be removed and the space opened up by the printing roller may be equipped with an inkjet printing unit. As a rule, the inkjet printing unit will have a smaller printing width than the printing roller that was removed. According to a preferred embodiment, a linear guide is accordingly furnished, so that the inkjet printing unit can be displaced transversely to the material web. The drawback of a printing machine with hybrid printing technology of this kind is that digital printing can only be combined with flexographic printing for very specific use cases.

In the printing machines that are known in the art, this results in the following problems overall:

- Limited flexibility for small and diverse jobs: How can flexibility be maximized while keeping costs consistently low?
- Need for different printing technologies for different jobs: Usually, depending on the available production capacity a job is prepared for either flexographic printing or digital printing. Can all jobs be processed on a single printing machine?

The object of the invention is therefore to create a printing machine with hybrid printing technology that can be used adaptably and flexibly in the context of current trends in digitization.

This object is accomplished by the features of claim 1. Additional preferred embodiments are presented in the dependent claims.

The printing machine according to the invention with hybrid printing technology for printing a continuous material web is a printing machine with a rotating central cylinder, on the surface of which the material web is guided from a placement point to a separation point for printing; wherein a plurality of inking units for digital printing of the material web are arranged in the region of an upper half of the central cylinder and a plurality of inking units for flexographic printing of the material web are arranged in the region of a lower half of the central cylinder; wherein an unwinding station is provided for unwinding the material web to be printed from a roll and a winding station is provided for winding the printed material web onto a roll, wherein the unwinding station and the winding station being arranged on a first side of the central cylinder; with supply guide rollers for feeding the material web unwound from the unwinding station to the central cylinder and with discharge guide rollers for discharging the printed material web from the central cylinder to the winding station; wherein the feed guide rollers and the discharge guide rollers are arranged on a second side of the central cylinder, with a feed guide roller for placing the material web onto the central cylinder at the placement point and a strip guide roller for detaching the material web from the central cylinder, the feed guide roller and the strip guide roller being designed in such a way that the placement point and the separation point are arranged on the lower quadrant of the guide cylinder.

The printing machine according to the invention enables a hybrid printing technology, by means of which the gap between conventional flexographic printing and digital printing can be closed. Because a plurality of inking units for digital printing are arranged in the region of an upper half of the central cylinder for printing the material web, and a plurality of inking units for flexographic printing are arranged in the region of a lower half of the central cylinder for printing the material web, flexographic printing can be applied in one pass, both before digital printing and after digital printing. Additionally, because the placement point and the separation point are arranged on the lower quadrant of the guide cylinder, the material web can be discharged to a drying station after flexographic printing without the printed side of the web coming into contact with a guide roller until it reaches a drying station.

The printing machine according to the invention thus exhibits a high degree of flexibility, because the material web may be printed using flexographic printing, digital printing or even a combination of both technologies. In view of the service life of the printing machine according to the invention, the ability to frequently change workflow gives rise to a higher productivity. Finally, this technology also allows greater flexibility in production planning.

Despite the limited installation space in the region of the central cylinder, the invention makes it possible for the inkjet inking units to be arranged in the region of the upper half of the central cylinder. This enables error-free operation of the inking units for inkjet printing without the influence of the gravity vector negatively becoming noticeable in the print image. In contrast, it was found that the quality of the inkjet print deteriorates if the inking units for inkjet printing have to be operated in the region of the lower half of the central cylinder. Thus, it is particularly advantageous for the inking units for inkjet printing to be arranged in the region of the upper half of the central cylinder.

According to a preferred embodiment, it is provided that the material web consists of a plastic film or a plastic film substitute or an aluminum web or a paper web. Plastic film is predominantly used in printing on flexible packaging; thus, the printing machine according to the invention may preferably be used in this field. Instead of a plastic film, however, a plastic film substitute such as for example polylactide (PLA) can also be used. Polylactide (PLA) is a non-naturally occurring polyester that is produced from sugar via a multi-stage synthesis. In this process, sugar is fermented to lactic acid, which is polymerized to PLA. PLA is biodegradable according to EN 13432, but this requires certain environmental conditions that are typically found only in industrial composting facilities. Printing on an aluminum web or a paper web is likewise possible with the printing machine according to the invention.

According to another preferred embodiment, it is provided that four inking units for flexographic printing are arranged in the region of the lower half of the central cylinder and eight inking units for digital printing are arranged in the region of the upper half of the central cylinder Such a combination results in a high degree of flexibility together with good cost-effectiveness. All other conceivable combinations are also possible, however. Thus, for reasons of cost, less than eight inking units for digital printing may be arranged in the upper half of the central cylinder, or less than four inking units for flexographic printing may be arranged in the lower half of the central cylinder. In the same way, to increase flexibility, more than eight inking units for digital printing may be arranged in the upper half of the central cylinder and more than four inking units for flexographic printing may be arranged in the lower half of the central cylinder.

According to another preferred embodiment, it is provided that two inking units for flexographic printing are arranged after the placement point and two inking units for flexographic printing are arranged before the separation point. The two inking units for flexographic printing after the placement point may preferably be furnished for applying a primer and/or a partial primer and/or a full-surface colored primer. The two inking units for flexographic printing upstream of the separation point may preferably be furnished for finishing (for example varnish application, etc.) the printed material web.

According to another preferred embodiment, it is provided that a drying station is arranged on the said first side of the central cylinder upstream of the winding station, for drying the printed material web. Additionally, because the placement point and the separation point are arranged on the lower quadrant of the guide cylinder, the material web can be discharged to a drying station after flexographic printing without the printed side of the web coming into contact with a guide roller until it reaches a drying station.

According to another preferred embodiment, a digital printing shutoff device is provided such that the printing machine may be operated purely as a flexographic printing machine. Correspondingly, alternatively or in combination with that, a flexographic printing shutoff device may also be furnished so that the press may be operated as a digital printing machine only.

Depending on the use case, the inking units for digital printing may be designed on the basis of a suitable digital printing process. In this case, two essential and fundamentally different processes are used in digital packaging printing: Electrophotography, with the dry toner process or the liquid toner process, and inkjet printing, which in turn is split up into drop-on-demand and continuous inkjet.

In the electrophotographic process, the image is first formed on a negatively charged image drum covered with photoreceptors. By means of exposure via a print head by LED or laser beam, the charge is removed and a latent, electrostatic charge image is generated. In the developer station, the toner sticks to the neutralized parts of the image drum. The print image is transferred to the substrate, either directly or via a rubber cylinder; it is fixed there and is created anew for each printing process. The image drum requires an exactly uniform exposure over the entire width; as a result, commercially available electrophotographic processes are limited to a maximum printing width of less than 800 mm.

The dry toner process is one of the oldest and most frequently used digital printing processes. It fixes the toner to the printing stock at high temperature. Consequently, there arises the process-related drawback of shrinkage of temperature-sensitive substrates, for which, however, suitable solutions have been found. In the packaging sector, the dry toner process comes close to the print quality of the liquid toner process; due to the toner being in powder form, however, it is somewhat slower than liquid toner and therefore does not afford any possibility of using spot colors in packaging applications. Compared to other processes, given that the toner is fixed by heat, the dry toner process does not require a primer and, is suitable for both indirect and direct contact with dry foodstuffs in various combinations of substrates and toners, depending on manufacturer requirements. In the dry toner process, the ink sequence can be selected at will for different applications in frontal, counter and interlayer printing.

In packaging printing, the liquid toner process offers a level of quality that is comparable to analog processes. In this process as well, an image drum is exposed, creating a latent print form that is subsequently inked with an electrically charged liquid toner. Similarly to offset printing, a rubber blanket cylinder is then used to transfer the developed ink separation from the image drum to the printing stock. The surface of the blanket cylinder is heated to approximately 105-110° C., so that the pigment-containing particles of the liquid toner begin to melt and form a thin plasticized layer that is still soft. Any carrier liquid that may still be present is evaporated. On contact with the cold printing stock, the liquid toner solidifies and adheres firmly to the printing stock.

Transfer by means of a blanket cylinder and the particle size of the liquid toner thus afford parallels to conventional offset printing. In the one-shot process in web printing systems, all ink separations are first accumulated on the rubber blanket cylinder and are then transferred together to the printing stock. Multi-separation is only used in sheet printing, in which the sheet passes through the printing unit repeatedly until all inks have been transferred. In principle, the liquid toner process allows a very high transfer speed; this speed, however, is correspondingly reduced by the collection and joint transfer of the inks. The print speed of the liquid toner process is therefore somewhat lower than that of inkjet systems at a comparable resolution.

In the liquid toner process, the four basic CMYK colors can be supplemented with orange, green and violet, in order to print in the extended color space or generate an improved simulation of the Pantone colors. For this purpose, five colors are often used, according to where the desired color is located in the color space. In addition, special colors may be mixed from the seven colors of the extended color space plus reflex blue, rhodamine red, light yellow and transparent spot colors, analogously to the offset process, and may be used as full-tone colors in one of the inking units. Liquid toners are known in the art that are suitable for indirect contact with dry foodstuffs. The electrically charged particles dissolved in liquid have a size of 1-2 microns and are able to precisely represent fine details due to their small size. They form a toner layer that has a smaller thickness than that of dry toners.

The inkjet process does not require an image carrier because the ink is transferred directly to the printing stock from the fine nozzles of a print head. The individual inkjet print heads differ from one another in structure. The contactless transfer of ink (non-impact printing) reduces the effect on the printing stock. The print heads are arranged in such a way that even large printing widths can be covered.

In the drop-on-demand process, the ink droplets are generated according to the print image and are ejected onto the substrate. In the piezo drop-on-demand process, the piezoceramic element on the inkjet spray head is controlled with the digital data. An acoustic wave is created through contraction of expansion of this element in the pump chamber, which leads to droplet formation at the outlet of the spray head. The shape and mass of droplet formation, as well as its speed, depend on the electrical pulse shape and frequency, as well as the ink parameters of surface tension and viscosity. Between 10,000-100,000 ink droplets having a nominal volume of 1-100 picoliters can be generated per second. In this case the ink quality has a decisive influence on the print quality.

In the thermal drop-on-demand process, also known as bubble jet, a small heating element is located above the nozzle opening of the reservoir, and the heating element generates a vapor bubble if it receives an electrical impulse for an image signal. The bubble ejects a precisely defined amount of ink from the nozzle opening. When the bubble recedes, a corresponding quantity of ink is drawn from the cartridge and the process starts over. In this case, heating and cooling take place in the microsecond range. Compared to other inkjet processes, thermal inkjet heads are cost-effective, and for that reason they can be correspondingly large in number so as to cover corresponding printing widths, print speeds and resolutions. They are also able to be replaced quite easily, but are subject to wear.

In the continuous inkjet process, there is a constant pressure in the nozzle and the size of the continuously emerging droplets is controlled via the image signal. At printing points, the droplets are larger and reach the substrate, while at non-printing points they are smaller and are directed by an air stream into a droplet catcher, and from there they pass back through the circuit. Up to 440,000 ink droplets can be generated per second, which enables high resolution and thus enables a correspondingly high print quality.

Inkjet processes work in packaging printing with aqueous pigment ink or UV ink. Up to seven colors are used, the four basic colors plus light magenta, light cyan and light black, or orange, green, violet or blue and/or special colors. Spot colors mixed from a basic color system are not used, because changing the ink heads in the machine would be too resource-intensive. For foodstuff packaging, low-migration water-based inks are available that are approved for their intended use. UV inks are evaluated very critically by the food industry with regard to migration and also because of their odor.

According to another preferred embodiment, it is provided that the inking units for digital printing consist of inking units for inkjet printing. Preferably, slide-in units are furnished for the inking units for inkjet printing in such a way that the inking units for inkjet printing are interchangeable in their positions. For this purpose, a star-shaped ink supply may be furnished such that the insert is automatically supplied with the printing ink corresponding to the inking unit for inkjet printing located in the insert.

Additional details and advantages of the invention will be described with reference to the attached drawings.

Figure 2:
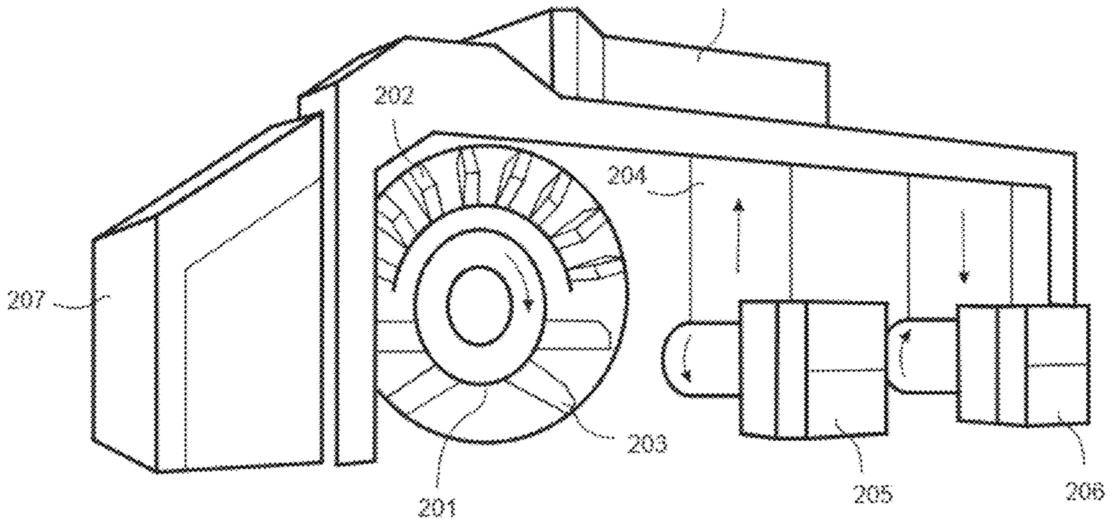
Figure 3:
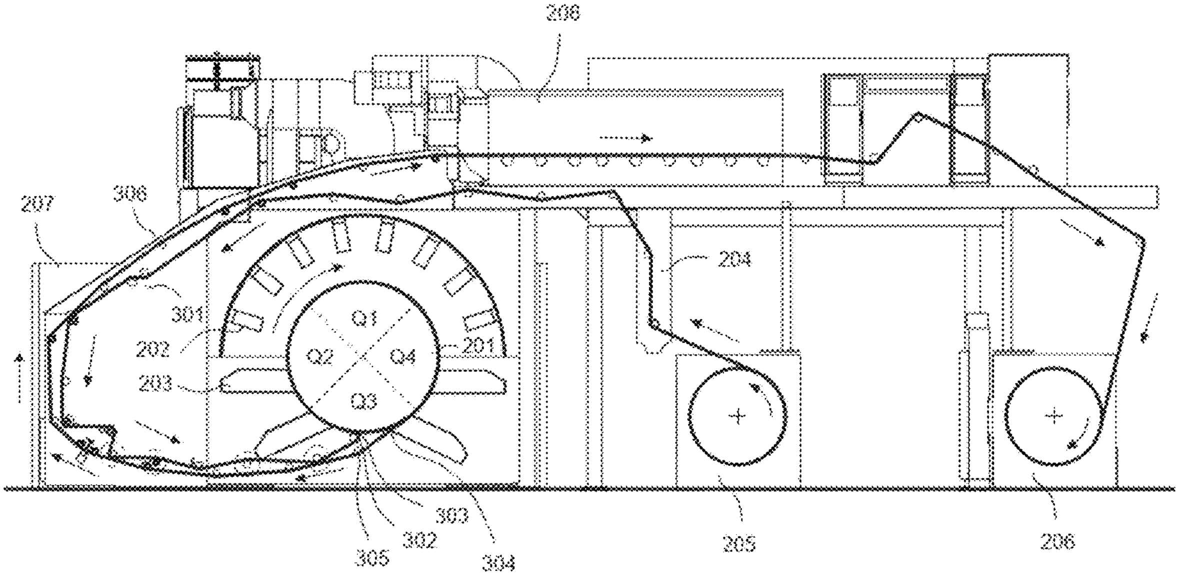

FIG. 1 shows a schematic representation of the spatial relationships on the central cylinder of the printing machine according to the invention, FIG. 2 shows a perspective view of the printing machine according to the invention, and FIG. 3 shows a side view of the printing machine according to the invention.

FIG. 1 shows a schematic diagram of the spatial relationships on the central cylinder of the printing press according to the invention. By way of a description of the spatial relationships, it is assumed without loss of generality that the central cylinder 101 rotates clockwise 102 within the stationary coordinate system with a horizontal x-axis and a vertical y-axis, and the origin of the coordinate system is located at the center of rotation of the central cylinder 101. Moreover, the gravity vector 103 is oriented parallel to the y-axis in the negative y-direction.

In this constellation, the upper half 104 of the central cylinder 101 refers to the space above the x-axis, while the lower half 105 of the central cylinder 101 defines the space below the x-axis.

Correspondingly, the left side 106 of the central cylinder 101 refers to the space to the left of the y-axis, while the right side 107 of the central cylinder 101 defines the space to the right of the y-axis.

Finally, the central cylinder 101 is divided into 4 quadrants Q1, Q2, Q3 and Q4, where quadrant Q1 is in the range 45° to 135°, quadrant Q2 is in the range 135° to 225°, quadrant Q3 is in the range 225° to 315° and quadrant Q4 is in the range 315° to 45°. From the preceding definitions, it also follows that quadrant Q1 is the upper quadrant, quadrant Q3 is the lower quadrant, quadrant Q2 is the left quadrant, and quadrant Q4 is the right quadrant.

FIG. 2 shows a perspective view of the printing machine according to the invention. In principle, the printing machine according to the invention consists of a central cylinder 201, in which eight inking units for inkjet printing 202 (which are collectively labeled with one reference number for the sake of simplicity) are arranged in the region of the upper half of the central cylinder and four inking units for flexographic printing 203 (which are collectively labeled with one reference number for the sake of simplicity) are arranged in the region of the lower half of the central cylinder. Arranging the inkjet inking units 202 in the region of the upper half of the central cylinder 201 enables error-free operation of the inking units for inkjet printing without the influence of the gravity vector negatively becoming noticeable in the print image. In contrast, it was found that the quality of the inkjet print deteriorates if the inking units for inkjet printing have to be operated in the region of the lower half of the central cylinder 201. Thus, it is particularly advantageous for the inking units for inkjet printing to be arranged in the region of the upper half of the central cylinder 201.

For printing, the material web 204 is guided from the unwinding station 205 to the central cylinder 201. The finished printed material web is rewound at the winding station 206.

A housing 207 is located on the left side of the central cylinder 201. In the housing 207, there are arranged supply guide rollers for supplying the material web 204 that has been unwound by the unwinding station 205 to the central cylinder 201, and discharge guide rollers for discharging the printed material web from the central cylinder 201 to the winding station 206.

A drying station 208 is located on the right side of the central cylinder 201; the drying station for drying the printed material web is arranged before the winding station 206. FIG. 3 shows a side view of the printing machine according to the invention. The components already described as shown in FIG. 2 are marked with the same reference numbers, so that in that regard reference is made to the description according to FIG. 2. In addition, the web guide of the material web 204 is described in detail below:

From the unwinding station 205, the material web 204 passes to the feed guide rollers 301 (which are labeled jointly with a single reference number for the sake of simplicity) located on the left side of the central cylinder in the housing 207. The supply guide rollers 301 guide the material web further to the feed guide roller 302, and from there the material web reaches the placement point 303 on the surface of the central cylinder 201.

On the surface of the central cylinder 201, the material web is guided with precision past the individual inking units 202 and 203. At the separation point 304, the material web is then detached by the strip guide roller 305 in a defined manner from the surface of the central cylinder 201. The placement point 303 as well as the separation point 304 are located in the region of the lower quadrant Q3 of the central cylinder 201. In this way, the material web can be discharged to the drying station 208 after flexographic printing, without the printed side of the material web coming into any further contact with a guide roller until it reaches a drying station.

From the separation point 304, the material web passes to the discharge guide rollers 306 (which are labeled jointly with a single reference number for the sake of simplicity), which are likewise located on the left side of the central cylinder in the housing 207. The discharge guide rollers 306 guide the material web further to the drying station 208, where the printed side of the material web is dried prior to being wound at the winding station 206.

The invention claimed is:

1. Printing machine with hybrid printing technology for printing a continuous material web, comprising:

a rotating central cylinder, on the surface of which the material web is guided from a placement point to a separation point for printing, wherein a plurality of inking units for digital printing of the material web are arranged in the region of an upper half of the central cylinder and a plurality of inking units for flexographic printing of the material web are arranged in the region of a lower half of the central cylinder;

an unwinding station for unwinding the material web to be printed from a roll and a winding station for winding the printed material web onto a roll, wherein the unwinding station and the winding station are arranged on a first side of the central cylinder;

supply guide rollers for feeding the material web unwound from the unwinding station to the central cylinder and discharge guide rollers for discharging the printed material web from the central cylinder to the winding station, wherein the supply guide rollers and the discharge guide rollers are arranged on a second side of the central cylinder, feed guide roller for placing the material web onto the central cylinder at the placement point and a strip guide roller for detaching the material web from the central cylinder, wherein the feed guide roller and the strip guide roller are designed in such a way that the placement point and the separation point are arranged on the lower quadrant of the guide cylinder.

2. Printing machine according to claim 1, wherein the material web is selected from the group consisting of a plastic film, a plastic film substitute, an aluminum web, a paper web, and combinations thereof.

3. Printing machine according to claim 1, wherein four inking units for flexographic printing are arranged in the region of the lower half of the central cylinder and eight inking units for digital printing are arranged in the region of the upper half of the central cylinder.

4. Printing machine according to claim 1, wherein two inking units for flexographic printing are arranged after the placement point and two inking units for flexographic printing are arranged before the separation point.

5. Printing machine according to claim 4, wherein the two inking units for flexographic printing are furnished after the placement point, for applying at least one of a primer, a partial primer, and a full-surface colored primer.

6. Printing machine according to claim 4, wherein the two inking units for flexographic printing are furnished before the separation point, for finishing the printed material web.

7. Printing machine according to claim 1, wherein a drying station for drying the printed material web is arranged on said first side of the central cylinder before the winding station.

8. Printing machine according to claim 1, further comprising a digital printing shutoff device, so that the printing machine may be operated purely as a flexographic printing machine.

9. Printing machine according to claim 1, further comprising a flexographic printing shutoff device, so that the printing machine may be operated purely as a digital printing machine.

10. Printing machine according to claim 1, wherein the inking units for digital printing consist of inking units for inkjet printing.

11. Printing machine according to claim 10, wherein inserts are furnished for the inkjet inking units in such a way that the inking units for inkjet printing are interchangeable in their positions.

12. Printing machine according to claim 11, further comprising a star-shaped ink supply of such a kind that the insert is automatically supplied with the printing ink corresponding to the inking unit for inkjet printing located in the insert.

* * * * *